United States Patent
Yoon et al.

(10) Patent No.: US 9,581,473 B2
(45) Date of Patent: Feb. 28, 2017

(54) FLOW RATE MEASURING DEVICE AND METHOD CAPABLE OF CORRECTING GRADIENT

(71) Applicant: COAVIS, Sejong-si (KR)

(72) Inventors: Suk Min Yoon, Chungcheongbuk-do (KR); Young Sub Jang, Sejong-si (KR); Se Jin Kim, Sejong-si (KR); In Gon Kim, Sejong-si (KR); In Seok Sohn, Chungcheongbuk-do (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 14/958,557

(22) Filed: Dec. 3, 2015

(65) Prior Publication Data
US 2016/0161309 A1    Jun. 9, 2016

(30) Foreign Application Priority Data
Dec. 3, 2014   (KR) .................. 10-2014-0171790

(51) Int. Cl.
*G01F 1/20*   (2006.01)
*G01F 1/00*   (2006.01)
*G01F 23/296*  (2006.01)

(52) U.S. Cl.
CPC .......... *G01F 1/007* (2013.01); *G01F 23/2962* (2013.01)

(58) Field of Classification Search
USPC ....................................... 73/861.18
See application file for complete search history.

(56) References Cited

U.S. PATENT DOCUMENTS

| | | | | |
|---|---|---|---|---|
| 3,633,756 A * | 1/1972 | Buckman | ............. | B01D 29/016 210/443 |
| 5,649,514 A * | 7/1997 | Okada | .................. | B01D 35/027 123/509 |
| 6,923,208 B2 * | 8/2005 | Okabe | .................. | F02M 37/106 123/509 |
| 8,919,326 B2 * | 12/2014 | Lim | ..................... | F02M 37/103 123/509 |

FOREIGN PATENT DOCUMENTS

KR     1020050041330 A     5/2005

* cited by examiner

*Primary Examiner* — Jewel V Thompson
(74) *Attorney, Agent, or Firm* — John D. Russell (57) ABSTRACT

The following disclosure relates to a flow rate measuring device and method capable of correcting a gradient. More particularly, the following disclosure relates to a flow rate measuring device and method capable of correcting a gradient that may measure a flow rate having a minimized measurement error by including a sensor unit provided on a bottom surface of an inner portion of a fuel tank in order to accurately measure a flow rate value remaining in the fuel tank to obtain distance information between the bottom surface of the fuel tank and an oil surface and gradient information of the fuel tank itself.

11 Claims, 4 Drawing Sheets

FLOW RATE MEASURING DEVICE AND METHOD CAPABLE OF CORRECTING GRADIENT

CROSS-REFERENCE TO RELATED APPLICATIONS

This application claims priority under 35 U.S.C. §119 to Korean Patent Application No. 10-2014-0171790, filed on Dec. 3, 2014, in the Korean Intellectual Property Office, the disclosure of which is incorporated herein by reference in its entirety.

TECHNICAL FIELD

The following disclosure relates to a flow rate measuring device and method capable of correcting a gradient. More particularly, the following disclosure relates to a flow rate measuring device and method capable of correcting a gradient that may measure a flow rate having a minimized measurement error by including a sensor unit provided on a bottom surface of an inner portion of a fuel tank in order to accurately measure a flow rate value remaining in the fuel tank to obtain distance information between the bottom surface of the fuel tank and an oil surface and gradient information of the fuel tank itself.

BACKGROUND

In order to measure a flow rate value remaining in a fuel tank for a ship or a vehicle, a flow meter including a float that ascends or descends or a pressure gauge has been used.

In the case of using the flow meter including the float that ascends or descends depending on an amount of fuel, when shaking of the ship or the vehicle is present, an oil surface is inclined, such that a measurement error of a remaining flow rate occurs. Therefore, it is impossible to accurately measure the flow rate.

The pressure gauge, which is a device calculating a pressure of liquid or gas in a closed container or a pressure generated due to gravity, measures a pressure changed depending on a remaining flow rate in the fuel tank to calculate a remaining flow rate value.

Also in the case of using the pressure gauge, a measurement value of the remaining flow rate is not accurate, and when shaking of the ship or the vehicle is severe, a measurement error of the remaining flow rate becomes large more and more, similar to the case of using the flow meter including the float that ascends or descends.

That is, in the case in which rolling and pitching of the ship due to shaking of water are severe or in the case in which the vehicle is driven on an uphill or a downhill, an oil surface of oil remaining in the fuel tank is inclined, such that it is impossible to accurately measure the remaining flow rate.

In Korean Patent Laid-Open Publication No. 10-2005-0041330 (entitled "Flow Rate Measuring Device of Fuel Tank Using Pressure Sensor" and referred to as Related Art Document 1), a flow rate measuring device of a fuel tank using a pressure sensor including air tubes mounted at multiple places of a corresponding width of the fuel tank and having an internal air pressure changed by an amount of fuel ascending or descending in the air tubes depending on a remaining amount of fuel of the fuel tank, a pressure measuring device measuring a pressure of air changed by the amount of fuel ascending or descending in the air tubes mounted at the multiple places, a controlling unit receiving the pressure of the air measured by the pressure measuring device to calculate a remaining amount of fuel, and a displaying unit receiving a signal of the controlling unit to display the remaining amount of fuel has been disclosed.

RELATED ART DOCUMENT

Patent Document

Korean Patent Laid-Open Publication No. 10-2005-0041330 (published on May 4, 2005)

SUMMARY

An embodiment of the present invention is directed to providing a flow rate measuring device and method capable of correcting a gradient that may measure a flow rate having a minimized measurement error by including a sensor unit provided on a bottom surface of an inner portion of a fuel tank in order to accurately measure a flow rate value remaining in the fuel tank to obtain distance information between the bottom surface of the fuel tank and an oil surface and gradient information of the fuel tank itself.

In one general aspect, a flow rate measuring device capable of correcting a gradient includes: a sensor unit 100 provided on a bottom surface of an inner portion of a fuel tank 1, and sensed information for measuring a current flow rate value remaining in the fuel tank 1 and transferring the sensed information; a calculating unit 200 calculating the current flow rate value remaining in the fuel tank 1 using the sensed information transferred from the sensor unit 100 per preset time or depending on a request of the outside; and a displaying unit 300 displaying the current flow rate value transferred from the calculating unit 200, wherein the sensor unit 100 includes: an ultrasonic sensor 110 attached onto the bottom surface of the inner portion of the fuel tank 1 and sensing distance information indicating a distance value between the bottom surface of the inner portion of the fuel tank 1 and an oil surface of oil remaining in the fuel tank; and a gradient sensor 120 attached onto the bottom surface of the inner portion of the fuel tank 1 and sensing gradient information indicating a gradient value of the fuel tank 1.

The calculating unit 200 may decide whether or not the ultrasonic sensor 110 and the gradient sensor 120 of the sensor unit 100 are normally operated, and control the displaying unit 300 to display a warning signal in the case in which the ultrasonic sensor 110 and the gradient sensor 120 of the sensor unit 100 are not normally operated.

The calculating unit 200 may receive the distance information transferred from the ultrasonic sensor 110 of the sensor unit 100, and calculate the distance value between the bottom surface of the inner portion of the fuel tank 1 and the oil surface of the oil remaining in the fuel tank 1 to calculate a first current flow rate value, and may receive the gradient information transferred from the gradient sensor 120 of the sensor unit 100, and control the displaying unit 300 to display the first current flow rate value in the case in which the gradient value of the fuel tank 1 is 2 degrees or less.

The calculating unit 200 may receive the distance information transferred from the ultrasonic sensor 110 of the sensor unit 100, and calculate the distance value between the bottom surface of the inner portion of the fuel tank 1 and the oil surface of the oil remaining in the fuel tank 1 to calculate a first current flow rate value, and may receive the gradient information transferred from the gradient sensor 120 of the sensor unit 100, and recalculate the first current flow rate value using a compensation value depending on a preset gradient value to calculate a second current flow rate value and control the displaying unit 300 to display the second current flow rate value, in the case in which the gradient value of the fuel tank 1 is 3 degrees or more and is 15 degrees or less.

The calculating unit 200 may receive the distance information transferred from the ultrasonic sensor 110 of the sensor unit 100, and calculate the distance value between the bottom surface of the inner portion of the fuel tank 1 and the oil surface of the oil remaining in the fuel tank 1 to calculate a first current flow rate value, and may receive the gradient information transferred from the gradient sensor 120 of the sensor unit 100, and request the sensor unit 110 to retransmit the sensed information and control the displaying unit 300 to display a warning signal and the first current flow rate value, in the case in which the gradient value of the fuel tank 1 is 16 degrees or more.

In another general aspect, a flow rate measuring method capable of correcting a gradient using a flow rate measuring device capable of correcting a gradient including an ultrasonic sensor and a gradient sensor provided on a bottom surface of an inner portion of a fuel tank and sensing distance information and gradient information for measuring a current flow rate value remaining in the fuel tank includes: a sensing step (S100) of obtaining the distance information indicating a distance value between the bottom surface of the inner portion of the fuel tank and an oil surface of oil remaining in the fuel tank from the ultrasonic sensor and obtaining the gradient information indicating a gradient value of the fuel tank from the gradient sensor (S100); a calculating step (S200) of calculating the current flow rate value remaining in the fuel tank using the information sensed in the sensing step (S100) per preset time or depending on a request of the outside in a calculating unit; and a displaying step (S300) of receiving and displaying the current flow rate value calculated in the calculating step (S200) in a displaying unit.

The flow rate measuring method capable of correcting a gradient may further include, before the sensing step (S100), a deciding step (S10) of deciding whether or not the ultrasonic sensor and the gradient sensor are normally operated, by the calculating unit, wherein in the case in which the ultrasonic sensor and the gradient sensor are not normally operated depending on a decision result in the deciding step (S10), the calculating unit controls the displaying unit to display a warning signal.

In the calculating step (S200), the calculating unit may receive the distance information transferred from the ultrasonic sensor, and calculate the distance value between the bottom surface of the inner portion of the fuel tank and the oil surface of the oil remaining in the fuel tank to calculate a first current flow rate value, and may receive the gradient information transferred from the gradient sensor, and set the first current flow rate value to the current flow rate value in the case in which the gradient value of the fuel tank is 2 degrees or less, and may receive the gradient information transferred from the gradient sensor 120, and recalculate the first current flow rate value using a compensation value depending on a preset gradient value to calculate a second current flow rate value and set the second current flow rate value to the current flow rate value, in the case in which the gradient value of the fuel tank is 3 degrees or more and is 15 degrees or less.

In the calculating step (S200), the calculating unit may receive the distance information transferred from the ultrasonic sensor, and calculate the distance value between the bottom surface of the inner portion of the fuel tank and the oil surface of the oil remaining in the fuel tank to calculate a first current flow rate value, and may receive the gradient information transferred from the gradient sensor, and set the first current flow rate value to the current flow rate value and control the displaying unit to display a warning signal, in the case in which the gradient value of the fuel tank 1 is 16 degrees or more.

After the calculating unit requests the ultrasonic sensor and the gradient sensor to retransmit the sensed information in the calculating step (S200), the sensing step (S100) and subsequent steps may be again performed.

DETAILED DESCRIPTION OF MAIN ELEMENTS

1: fuel tank
100: sensor unit
110: ultrasonic sensor
120: gradient sensor
200: calculating unit
300: displaying unit

DETAILED DESCRIPTION OF EMBODIMENTS

Hereinafter, a flow rate measuring device and method capable of correcting a gradient according to an exemplary embodiment of the present invention will be described in detail with reference to the accompanying drawings. The accompanying drawings to be provided below are provided by way of example so that the idea of the present invention can be sufficiently transferred to those skilled in the art to which the present invention pertains. Therefore, the present invention is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

Figure 1:
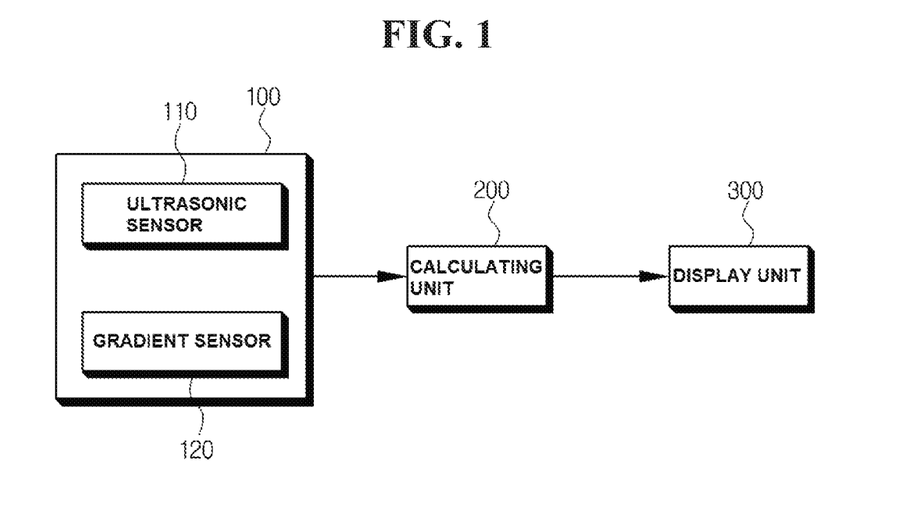
FIG. 1 is a block diagram schematically illustrating a flow rate measuring device capable of correcting a gradient according to an exemplary embodiment of the present invention.

FIG. 1 is a block diagram schematically illustrating a flow rate measuring device capable of correcting a gradient according to an exemplary embodiment of the present invention. Components of the flow rate measuring device capable of correcting a gradient according to an exemplary embodiment of the present invention will be described in detail with reference to FIG. 1.

The flow rate measuring device capable of correcting a gradient according to an exemplary embodiment of the present invention may be configured to include a sensor unit 100 attached onto a bottom surface of an inner portion of a fuel tank 1 and including an ultrasonic sensor 110 and a gradient sensor 120, a calculating unit 200, and a displaying unit 300, as illustrated in FIG. 1.

The respective components will be described in detail.

Figure 2:
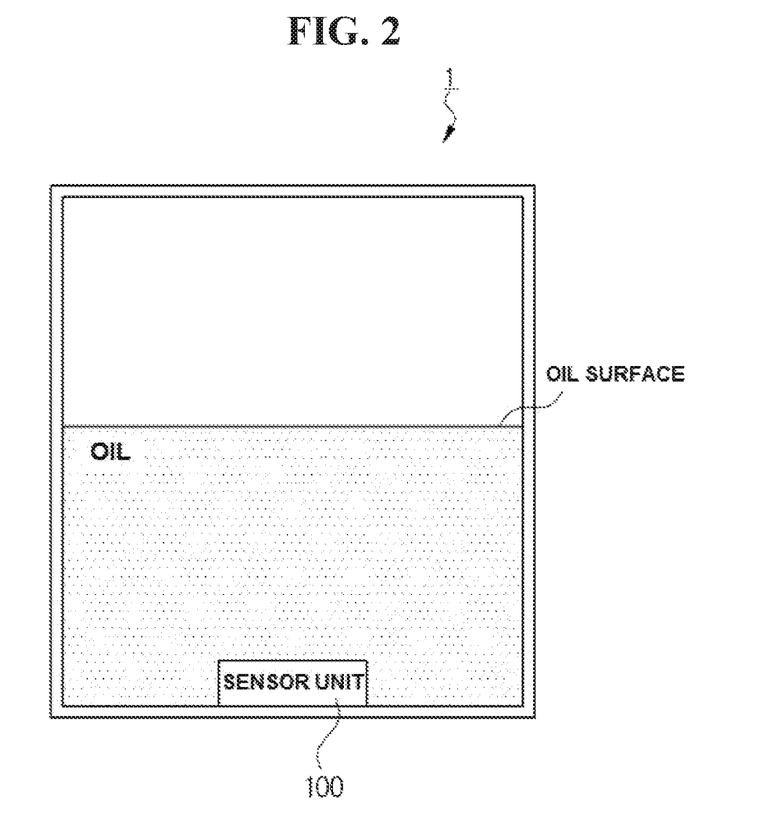
FIG. 2 is a view illustrating a fuel tank 1 including a sensor unit 100 of the flow rate measuring device capable of correcting a gradient according to an exemplary embodiment of the present invention.

The sensor unit 100 may be provided on the bottom surface of the inner portion of the fuel tank 1, as illustrated in FIG. 2, and may sense information for measuring a current flow rate value remaining in the fuel tank 1 and transfer the sensed information.

The sensor unit 100 is configured to include the ultrasonic sensor 110 and the gradient sensor 120, as described above.

The ultrasonic sensor 110 is attached onto the bottom surface of the inner portion of the fuel tank 1, and senses distance information indicating a distance value between the bottom surface of the inner portion of the fuel tank 1 and an oil surface of oil remaining in the fuel tank 1.

In detail, the ultrasonic sensor 110 includes a transmitter (not illustrated) and a receiver (not illustrated). When the transmitter transmits an ultrasonic wave to the oil surface of the oil remaining in the fuel tank 1, the receiver receives an ultrasonic wave reflected from the oil surface, the distance information indicating the distance value between the bottom surface of the inner portion of the fuel tank 1 and the oil surface of the oil remaining in the fuel tank 1 may be calculated through a difference between a transmission time and a reception time of the ultrasonic wave.

The gradient sensor 120 is attached onto the bottom surface of the inner portion of the fuel tank 1, and senses gradient information indicating a gradient value of the fuel tank 1.

In detail, the gradient sensor 120 may sense gradients with respect to the fuel tank 1 in an X direction and a Y direction to calculate gradient information corresponding to the gradients.

The calculating unit 200 may calculate the current flow rate value remaining in the fuel tank 1 using the sensed information transferred from the sensor unit 100, that is, the distance information indicating the distance value between the bottom surface of the inner portion of the fuel tank 1 and the oil surface of the oil remaining in the fuel tank 1 and the gradient information indicating the gradient value of the fuel tank 1, per preset time or depending on a request of the outside.

The displaying unit 300 displays the current flow rate value transferred from the calculating unit 200 so that the current flow rate value may be confirmed at the outside (manager).

Before calculating the current flow rate value remaining in the fuel tank, the calculating unit 200 decides whether or not the ultrasonic sensor 110 and the gradient sensor 120 of the sensor unit 100 are normally operated, and controls the displaying unit 300 to display a warning signal in the case in which the ultrasonic sensor 110 and the gradient sensor 120 of the sensor unit 100 are not normally operated, thereby making it possible to inform the manager whether or not the sensors are abnormal.

In addition, the calculating unit 200 calculates the current flow rate value remaining in the fuel tank 1 per preset time or depending on the request of the outside (manager), such that the manager may rapidly figure out the current flow rate value in the fuel tank 1 and easily take a countermeasure.

The calculating unit 200 calculates the current flow rate value having the smallest measurement error variously using the distance information transferred from the ultrasonic sensor 110 and the gradient information transferred from the gradient sensor 120.

Here, the gradient information transferred from the gradient sensor 120 means a gradient angle of a vehicle, and the current flow rate value primarily calculated using the distance information is compensated for using a compensation value preset depending on the gradient information, thereby making it possible to calculate a final flow rate value having a decreased measurement error.

First Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and may control the displaying unit 300 to display the set first current flow rate value in the case in which the gradient value of the fuel tank 1 is 2 degrees or less.

That is, in the case in which the gradient value of the fuel tank 1 is 2 degrees or less, this gradient value is too small to have an influence on transmission and reception of the ultrasonic wave in the ultrasonic sensor 110. Therefore, the flow rate value calculated through the ultrasonic sensor 110 may be set to a current flow rate value.

Second Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and compensates for the set first current flow rate value using a compensation value depending on a preset gradient value to perform recalculation as a second current flow rate value in the case in which the gradient value of the fuel tank 1 is 3 degrees or more and is 15 degrees or less.

The calculating unit 200 may control the displaying unit 300 to display the set second current flow rate value.

That is, in the case in which the gradient value of the fuel tank 1 is 3 degrees or more and is 15 degrees or less, the current flow rate value needs to be recalculated.

In detail, in the case in which the fuel tank 1 is inclined at an angle of 3 degrees to 15 degrees, a reception signal reflected and returned from the oil surface after the ultrasonic sensor 110 transmits the ultrasonic wave is inaccurate. Therefore, the current flow rate value calculated using only the distance information in the ultrasonic sensor 110 is compensated for using a compensation value depending on a preset gradient value (gradient information), thereby making it possible to calculate the current flow rate value having a decreased measurement error.

Here, the compensation value depending on the preset gradient value is illustrated in the following Table 1. However, this is only an example of the present invention.

TABLE 1

| | Gradient Information (°) | | |
|---|---|---|---|
| | 2 degrees or less | 3 degrees or more to 15 degrees or less | 16 degrees or more |
| Compensation Value (mm) | First Current Flow Rate Value | First Current Flow Rate Value + (Gradient Angle * Offset) | First Current Flow Rate Value (Previous Flow Rate Value) |

Here, the offset is changed depending on a size of a cell of the ultrasonic sensor 110.

That is, the compensation value may be represented by First Current Flow Rate Value+(Gradient Information*Offset).

Third Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and may control the displaying unit 300 to display a warning signal while controlling the displaying unit 300 to display the set first current flow rate value in the case in which the gradient value of the fuel tank 1 is 16 degrees or more.

In addition, the calculating unit requests the sensor unit 100 to retransmit the distance information and the gradient information.

In other words, in the case in which the gradient value of the fuel tank 1 transferred from the gradient sensor 120 of the sensor unit 100 16 degrees or more, the calculating unit 200 decides that abnormity is present in the ultrasonic sensor or the gradient sensor or a current state of the fuel tank 1 is a state in which it is impossible to accurately measure the remaining flow rate value.

Therefore, the calculating unit 200 may transfer the first current flow rate value, which is the previous current flow rate value, together with a warning signal to the displaying unit 300 to inform inaccuracy of the current flow rate value.

In addition, the calculating unit 200 calculates the current flow rate value using the distance information and the gradient information once more, thereby making it possible to overcome the inaccuracy.

Fourth Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and may control the displaying unit 300 to display the set first current flow rate value in the case in which the gradient value of the fuel tank 1 is less than 5 degrees.

That is, in the case in which the gradient value of the fuel tank 1 is less than 5 degrees, this gradient value is too small to have an influence on transmission and reception of the ultrasonic wave in the ultrasonic sensor 110. Therefore, the flow rate value calculated through the ultrasonic sensor 110 may be set to a current flow rate value.

In other words, in the flow rate measuring devices capable of correcting a gradient according to first to fourth exemplary embodiments of the present invention, the calculating unit 200 may recalculate the current flow rate value calculated using the distance value depending on the gradient value of the fuel tank 1, and a reference of the gradient value for the recalculation may be differently set depending on a transmission range and a reception range of an ultrasonic signal in the ultrasonic sensor 110.

In addition, the flow rate measuring device capable of correcting a gradient according to the present invention may further include an analog to digital converting unit (not illustrated) and a power supplying unit (not illustrated).

The analog to digital converting unit converts the distance information and the gradient information transferred from the ultrasonic sensor 110 and the gradient sensor 120 of the sensor unit 100 into digital signals and outputs the digital signals, and the calculating unit 200 may perform an operation of calculating the current flow rate value using the distance information and the gradient information converted into the digital signals.

The power supplying unit may supply driving power to the ultrasonic sensor 110 and the gradient sensor 120 of the sensor unit 100 and the calculating unit 200.

Figure 3:
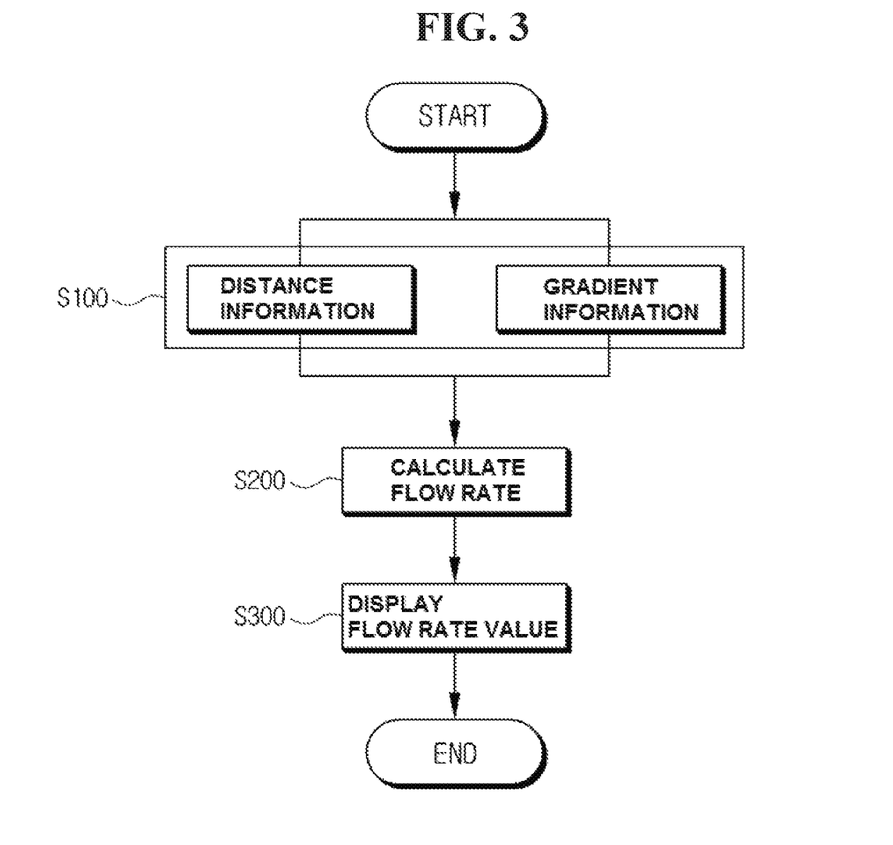
FIG. 3 is a flow chart schematically illustrating a flow rate measuring method capable of correcting a gradient according to an exemplary embodiment of the present invention.
Figure 4:
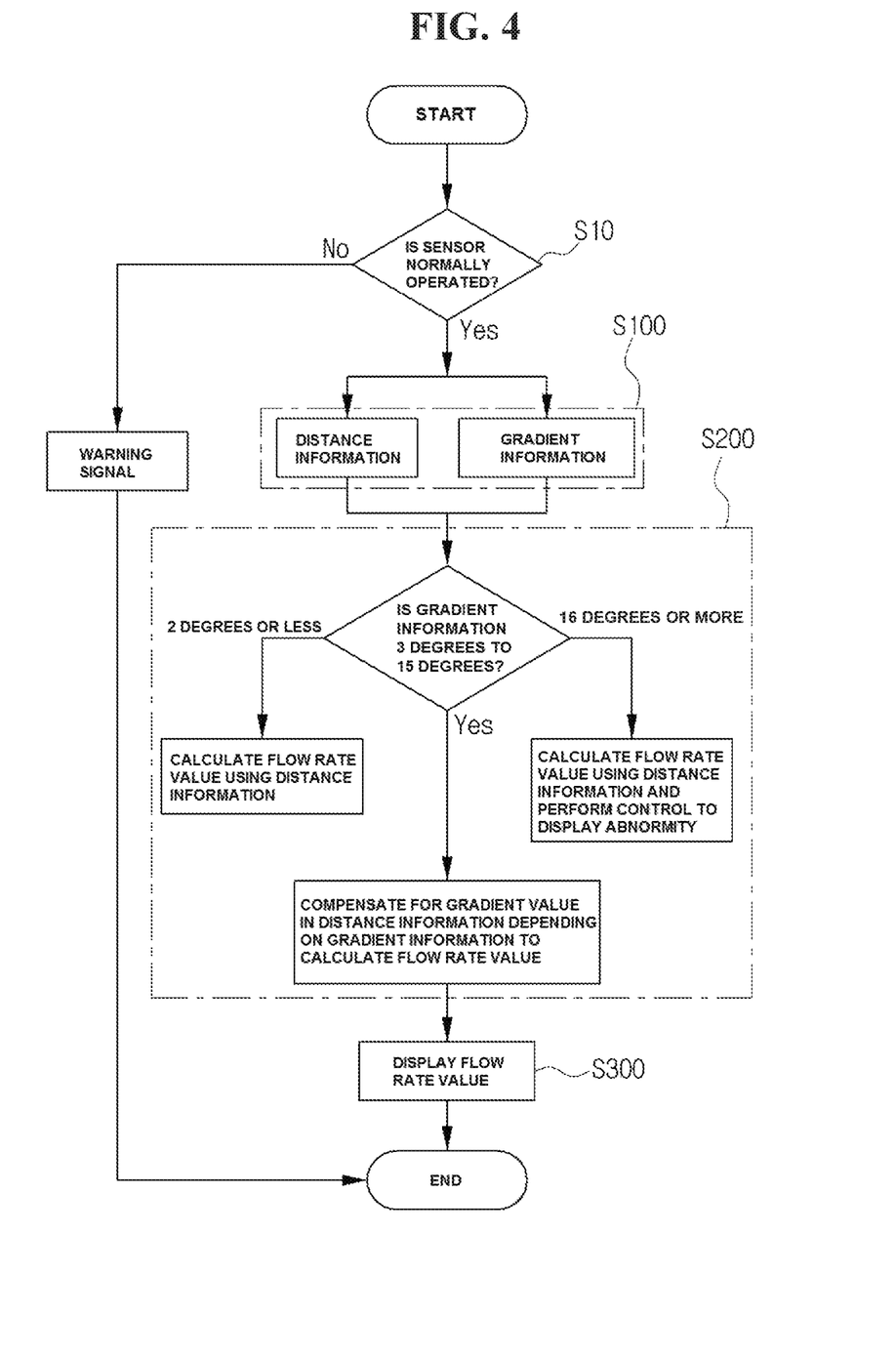
FIG. 4 is a flow chart illustrating a flow rate measuring method capable of correcting a gradient according to an exemplary embodiment of the present invention in detail.

FIGS. 3 and 4 are flow charts illustrating a flow rate measuring method capable of correcting a gradient according to an exemplary embodiment of the present invention. Steps of the flow rate measuring method capable of correcting a gradient according to an exemplary embodiment of the present invention will be described in detail with reference to FIGS. 3 and 4.

The flow rate measuring method capable of correcting a gradient according to an exemplary embodiment of the present invention may include a sensing step (S100), a calculating step (S200), and a displaying step (S300), as shown in FIG. 3.

The respective steps will be described in detail.

In the sensing step (S100), the distance information indicating the distance value between the bottom surface of the inner portion of the fuel tank 1 and the oil surface of the oil remaining in the fuel tank 1 may be obtained from the ultrasonic sensor 110 of the sensor unit 100, and the gradient information indicating the gradient value of the fuel tank 1 may be obtained from the gradient sensor 120 of the sensor unit 100.

In the calculating step (S200), the calculating unit 200 may calculate the current flow rate value remaining in the fuel tank 1 using the information sensed in the sensing step (S100) per preset time or depending on the request of the outside.

In the calculating step (S200), the current flow rate value having the smallest measurement error is calculated variously using the distance information transferred from the ultrasonic sensor 110 and the gradient information transferred from the gradient sensor 120.

The calculating step (S200) will be described in detail.

First Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and may control the displaying unit 300 to display the set first current flow rate value in the case in which the gradient value of the fuel tank 1 is 2 degrees or less.

That is, in the case in which the gradient value of the fuel tank 1 is 2 degrees or less, this gradient value is too small to have an influence on transmission and reception of the ultrasonic wave in the ultrasonic sensor 110. Therefore, the flow rate value calculated through the ultrasonic sensor 110 may be set to a current flow rate value.

Second Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and compensates for the set first current flow rate value using a compensation value depending on a preset gradient value to perform recalculation as a second current flow rate value in the case in which the gradient value of the fuel tank 1 is 3 degrees or more and is 15 degrees or less.

The calculating unit 200 may control the displaying unit 300 to display the set second current flow rate value.

That is, in the case in which the gradient value of the fuel tank 1 is 3 degrees or more and is 15 degrees or less, the current flow rate value needs to be recalculated.

In detail, in the case in which the fuel tank 1 is inclined at an angle of 3 degrees to 15 degrees, a reception signal reflected and returned from the oil surface after the ultrasonic sensor 110 transmits the ultrasonic wave is inaccurate.

Therefore, the current flow rate value calculated using only the distance information in the ultrasonic sensor 110 is compensated for using a compensation value depending on a preset gradient value (gradient information), thereby making it possible to calculate the current flow rate value having a decreased measurement error.

Here, the compensation value depending on the preset gradient value is illustrated in the above Table 1. However, this is only an example of the present invention.

Third Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and may control the displaying unit 300 to display a warning signal while controlling the displaying unit 300 to display the set first current flow rate value in the case in which the gradient value of the fuel tank 1 is 16 degrees or more.

In addition, the calculating unit requests the sensor unit 100 to retransmit the distance information and the gradient information.

In other words, in the case in which the gradient value of the fuel tank 1 transferred from the gradient sensor 120 of the sensor unit 100 16 degrees or more, the calculating unit 200 decides that abnormity is present in the ultrasonic sensor or the gradient sensor or a current state of the fuel tank 1 is a state in which it is impossible to accurately measure the remaining flow rate value.

Therefore, the calculating unit 200 may transfer the first current flow rate value, which is the previous current flow rate value, together with a warning sign to the displaying unit 300 to inform inaccuracy of the current flow rate value.

In addition, the calculating unit 200 calculates the current flow rate value using the distance information and the gradient information once more, thereby making it possible to overcome the inaccuracy.

Fourth Exemplary Embodiment

The calculating unit 200 first receives the distance information transferred from the ultrasonic sensor 110 of the sensor unit 100, and calculates the distance value between the bottom surface of the inner portion of the fuel tank 1 and the oil surface of the oil remaining in the fuel tank 1 to calculate a first current flow rate value. That is, the distance value may be calculated using the difference between the transmission time and the reception time of the ultrasonic wave and be set to the first current flow rate value.

Then, the calculating unit 200 receives the gradient information of the fuel tank 1 transferred from the gradient sensor 120 of the sensor unit 100, and may control the displaying unit 300 to display the set first current flow rate value in the case in which the gradient value of the fuel tank 1 is less than 5 degrees.

That is, in the case in which the gradient value of the fuel tank 1 is less than 5 degrees, this gradient value is too small to have an influence on transmission and reception of the ultrasonic wave in the ultrasonic sensor 110. Therefore, the flow rate value calculated through the ultrasonic sensor 110 may be set to a current flow rate value.

In the flow rate measuring methods capable of correcting a gradient according to first to fourth exemplary embodiments of the present invention, as described above, the calculating unit 200 may recalculate the current flow rate value calculated using the distance value depending on the gradient value of the fuel tank 1, and the reference of the gradient value for the recalculation may be differently set depending on the transmission range and the reception range of the ultrasonic signal in the ultrasonic sensor 110.

In the displaying step (S300), the displaying unit 300 may receive and display the current flow rate value calculated in the calculating step (S200).

In addition, the flow rate measuring methods capable of correcting a gradient according to an exemplary embodiment of the present invention may further include, before the sensing step (S100), a deciding step (S10) of deciding whether or not the ultrasonic sensor 110 and the gradient sensor 120 are normally operated, by the calculating unit 200.

In the case in which the ultrasonic sensor 110 and the gradient sensor 120 may not be normally operated depending on a decision result in the deciding step (S10), the calculating unit 200 may control the displaying unit 300 to display a warning signal.

In other words, in the flow rate measuring device and method capable of correcting a gradient according to an exemplary embodiment of the present invention, the current flow rate value of the oil remaining in the fuel tank 1 may be accurately measured using the ultrasonic sensor 110 and the gradient sensor 120 attached onto the bottom surface of the inner portion of the fuel tank 1.

Since the ultrasonic sensor 110 and the gradient sensor 120 are submerged in the oil, a negative influence due to exposure of the ultrasonic sensor 110 and the gradient sensor 120 to the outside may be less generated, and the distance value from the bottom surface of the fuel tank 1 to the oil surface measured in the ultrasonic sensor 110 is compensated for depending on the gradient of the fuel tank 1, thereby making it possible to measure the current flow rate value having a small measurement error.

In the flow rate measuring device and method capable of correcting a gradient according to the present invention having the configuration as described above, the sensor unit is provided on the bottom surface of the inner portion of the fuel tank in order to accurately measure the flow rate value remaining in the fuel tank to obtain the distance information between the bottom surface of the fuel tank and the oil surface and the gradient information of the fuel tank itself, thereby making it possible to measure a remaining flow rate having a minimized measurement error.

That is, in order to correct that the ultrasonic sensor obtaining the distance information from the bottom surface of the fuel tank to the oil surface obtains an inaccurate reflection signal due to an arrival time of a reflection signal changed depending on a gradient of the oil surface, that is, a gradient of the fuel tank or obtains an inaccurate reflection signal due to loss of the reflection signal, the gradient information of the fuel tank is obtained, and the distance information is compensated for depending on the gradient information, thereby making it possible to calculate a remaining flow rate having a minimized measurement error.

Here, the ultrasonic sensor obtaining the distance information and the gradient sensor obtaining the gradient information are formed in one sensor unit, thereby making it possible to decrease a cost.

In addition, the sensor unit is provided on the bottom surface of the inner portion of the fuel tank, such that the sensor unit is exposed to air, thereby making it possible to minimize an error due to the exposure.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A flow rate measuring device capable of correcting a gradient, comprising:
   a sensor unit provided on a bottom surface of an inner portion of a fuel tank, and sensed information for measuring a current flow rate value remaining in the fuel tank and transferring the sensed information;
   a calculating unit calculating the current flow rate value remaining in the fuel tank using the sensed information transferred from the sensor unit per preset time or depending on a request of the outside; and
   a displaying unit displaying the current flow rate value transferred from the calculating unit,
   wherein the sensor unit includes:
   an ultrasonic sensor attached onto the bottom surface of the inner portion of the fuel tank and sensing distance information indicating a distance value between the bottom surface of the inner portion of the fuel tank and an oil surface of oil remaining in the fuel tank; and
   a gradient sensor attached onto the bottom surface of the inner portion of the fuel tank and sensing gradient information indicating a gradient value of the fuel tank.

2. The flow rate measuring device capable of correcting a gradient of claim 1, wherein the calculating unit
   decides whether or not the ultrasonic sensor and the gradient sensor of the sensor unit are normally operated, and
   controls the displaying unit to display a warning signal in the case in which the ultrasonic sensor and the gradient sensor of the sensor unit are not normally operated.

3. The flow rate measuring device capable of correcting a gradient of claim 1, wherein the calculating unit
   receives the distance information transferred from the ultrasonic sensor of the sensor unit, and calculates the distance value between the bottom surface of the inner portion of the fuel tank and the oil surface of the oil remaining in the fuel tank to calculate a first current flow rate value, and
   receives the gradient information transferred from the gradient sensor of the sensor unit, and controls the displaying unit to display the first current flow rate value in the case in which the gradient value of the fuel tank is 2 degrees or less.

4. The flow rate measuring device capable of correcting a gradient of claim 1, wherein the calculating unit
   receives the distance information transferred from the ultrasonic sensor of the sensor unit, and calculates the distance value between the bottom surface of the inner portion of the fuel tank and the oil surface of the oil remaining in the fuel tank to calculate a first current flow rate value, and
   receives the gradient information transferred from the gradient sensor of the sensor unit, and recalculates the first current flow rate value using a compensation value depending on a preset gradient value to calculate a second current flow rate value and controls the displaying unit to display the second current flow rate value, in the case in which the gradient value of the fuel tank is 3 degrees or more and is 15 degrees or less.

5. The flow rate measuring device capable of correcting a gradient of claim 1, wherein the calculating unit receives the distance information transferred from the ultrasonic sensor of the sensor unit, and calculates the distance value between the bottom surface of the inner portion of the fuel tank and the oil surface of the oil remaining in the fuel tank to calculate a first current flow rate value, and receives the gradient information transferred from the gradient sensor of the sensor unit, and requests the sensor unit to retransmit the sensed information and controls the displaying unit to display a warning signal and the first current flow rate value, in the case in which the gradient value of the fuel tank is 16 degrees or more.

6. A flow rate measuring method capable of correcting a gradient using a flow rate measuring device capable of correcting a gradient including an ultrasonic sensor and a gradient sensor provided on a bottom surface of an inner portion of a fuel tank and sensing distance information and gradient information for measuring a current flow rate value remaining in the fuel tank, comprising:

a sensing step of obtaining the distance information indicating a distance value between the bottom surface of the inner portion of the fuel tank and an oil surface of oil remaining in the fuel tank from the ultrasonic sensor and obtaining the gradient information indicating a gradient value of the fuel tank from the gradient sensor;

a calculating step of calculating the current flow rate value remaining in the fuel tank using the information sensed in the sensing step per preset time or depending on a request of the outside in a calculating unit; and a displaying step of receiving and displaying the current flow rate value calculated in the calculating step in a displaying unit.

7. The flow rate measuring method capable of correcting a gradient of claim 6, further comprising, before the sensing step, a deciding step of deciding whether or not the ultrasonic sensor and the gradient sensor are normally operated, by the calculating unit, wherein in the case in which the ultrasonic sensor and the gradient sensor are not normally operated depending on a decision result in the deciding step, the calculating unit controls the displaying unit to display a warning signal.

8. The flow rate measuring method capable of correcting a gradient of claim 6, wherein in the calculating step, the calculating unit receives the distance information transferred from the ultrasonic sensor, and calculates the distance value between the bottom surface of the inner portion of the fuel tank and the oil surface of the oil remaining in the fuel tank to calculate a first current flow rate value, and receives the gradient information transferred from the gradient sensor, and sets the first current flow rate value to the current flow rate value in the case in which the gradient value of the fuel tank is 2 degrees or less.

9. The flow rate measuring method capable of correcting a gradient of claim 6, wherein in the calculating step, the calculating unit receives the distance information transferred from the ultrasonic sensor, and calculates the distance value between the bottom surface of the inner portion of the fuel tank and the oil surface of the oil remaining in the fuel tank to calculate a first current flow rate value, and receives the gradient information transferred from the gradient sensor, and recalculates the first current flow rate value using a compensation value depending on a preset gradient value to calculate a second current flow rate value and sets the second current flow rate value to the current flow rate value, in the case in which the gradient value of the fuel tank is 3 degrees or more and is 15 degrees or less.

10. The flow rate measuring method capable of correcting a gradient of claim 6, wherein in the calculating step, the calculating unit receives the distance information transferred from the ultrasonic sensor, and calculates the distance value between the bottom surface of the inner portion of the fuel tank and the oil surface of the oil remaining in the fuel tank to calculate a first current flow rate value, and receives the gradient information transferred from the gradient sensor, and sets the first current flow rate value to the current flow rate value and controls the displaying unit to display a warning signal, in the case in which the gradient value of the fuel tank is 16 degrees or more.

11. The flow rate measuring method capable of correcting a gradient of claim 10, wherein after the calculating unit requests the ultrasonic sensor and the gradient sensor to retransmit the sensed information in the calculating step, the sensing step and subsequent steps are again performed.

* * * * *